(12) United States Patent
Keil

(10) Patent No.: US 10,476,600 B2
(45) Date of Patent: Nov. 12, 2019

(54) OPTICAL SIGNAL MODULATOR COMPRISING A FEEDBACK-LOOP

(71) Applicant: Sicoya GmbH, Berlin (DE)

(72) Inventor: Ulrich Keil, Berlin (DE)

(73) Assignee: SICOYA GMBH, Berlin (DE)

( * ) Notice: Subject to any disclaimer, the term of this patent is extended or adjusted under 35 U.S.C. 154(b) by 0 days.

(21) Appl. No.: 15/870,219

(22) Filed: Jan. 12, 2018

(65) Prior Publication Data

US 2019/0222319 A1 Jul. 18, 2019

(51) Int. Cl.
*H04B 10/548* (2013.01)

(52) U.S. Cl.
CPC .................. *H04B 10/548* (2013.01)

(58) Field of Classification Search
CPC ............ H04B 10/548; H04B 10/505; H04B 10/5561; H04B 10/5051; H04B 10/5053; H04B 10/5055
See application file for complete search history.

(56) References Cited

U.S. PATENT DOCUMENTS

| | | | |
|---|---|---|---|
| 6,469,817 B1 * | 10/2002 | Heflinger | G02F 1/0123 398/202 |
| 8,269,431 B2 | 9/2012 | Then et al. | |
| 2005/0211875 A1 * | 9/2005 | Kawanishi | G02F 1/2255 250/208.1 |
| 2007/0165294 A1 | 7/2007 | Witzel | |
| 2009/0296192 A1 | 12/2009 | Morishita | |
| 2010/0200733 A1 | 8/2010 | McLaren et al. | |
| 2011/0206384 A1 | 8/2011 | Zhou et al. | |
| 2012/0155880 A1 | 6/2012 | Nishimoto et al. | |

OTHER PUBLICATIONS

Min-Hyeong Kim et al.; "An Integrated Mach-Zehnder Modulator Bias Controller Based On Eye-Amplitude Monitoring" ; Smart Photonic and Optoelectronic Integrated Circuits XVIII, Proceedings of SPIE vol. 9751, 97510X; Mar. 2, 2016; pp. 9751 97510X-1-9751 97510X-6.
International Search Report dated Mar. 18, 2019 issued in related International Application No. PCT/EP2018/085595 filed Dec. 18, 2018.

* cited by examiner

*Primary Examiner* — Ted M Wang
(74) *Attorney, Agent, or Firm* — Gordon Rees Scully Mansukhani, LLP

(57) ABSTRACT

An optical signal modulator comprising a modulator unit, a photodetector and an electrical signal combiner. The modulator unit having an optical ingress port for optical radiation, a first and second optical output port each for modulated optical radiation, and an electrical ingress port for an electrical modulation signal. The optical radiation is modulated in response to the electrical modulation signal. The photodetector is connected to the second optical output port and configured to measure the modulated optical radiation that is emitted, and to provide a monitor signal. The electrical signal combiner having a first input port for an external electrical data signal, a second electrical input port for a correction signal based on the monitor signal, and an electrical output port that is connected to the electrical ingress port. The combiner generates the electrical modulation signal by combining the external electrical data signal and the correction signal.

9 Claims, 10 Drawing Sheets

OPTICAL SIGNAL MODULATOR COMPRISING A FEEDBACK-LOOP

The invention relates to optical signal modulators and methods of operating optical signal modulators.

BACKGROUND OF THE INVENTION

An optical signal modulator is disclosed for instance in FIG. 3 of U.S. Pat. No. 8,269,431 B2. This optical signal modulator comprises a Mach-Zehnder interferometer and a modulator bias control which allows adjusting the operating point of the Mach-Zehnder interferometer.

OBJECTIVE OF THE PRESENT INVENTION

An objective of the present invention is to provide an optical signal modulator that provides modulated optical signals with enhanced signal quality.

A further objective of the present invention is to provide a method of operating an optical signal modulator such that modulated output radiation shows enhanced signal quality.

BRIEF SUMMARY OF THE INVENTION

An embodiment of the present invention relates to an optical signal modulator comprising a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal.

The modulator unit, the photodetector and the combiner are preferably integrated in the same semiconductor chip.

The signal delay from the second output port of the modulator unit via the photodetector and the combiner to the electrical ingress port of the modulator unit is preferably shorter than 10 ps.

The modulator unit, the photodetector and the combiner are preferably integrated in semiconductor layers located on the same semiconductor substrate of the same semiconductor chip.

According to a preferred embodiment, the signal modulator is configured to generate an optical data signal having a given bit duration, wherein the signal path extending from the second output of the modulator unit via the photodetector and the combiner to the electrical ingress port of the modulator unit is so short that the signal travel time falls below 25% of said given bit duration.

The modulator unit may comprise an MMI-coupler having a first output port and a second output port, wherein the first output port of the MMI-coupler forms the first optical output port of the modulator unit and wherein the second output port of the MMI-coupler forms the second optical output port of the modulator unit.

Alternatively or additionally, the modulator unit may comprise a Mach-Zehnder-Interferometer and a phase modulator located in at least one interferometer arm of the Mach-Zehnder-Interferometer, wherein said electrical modulation signal is applied to the at least one phase modulator.

The Mach-Zehnder-Interferometer may comprise a 3 dB-MMI-output-coupler having a first output port and a second output port, wherein the first output port of the MMI-coupler forms the first optical output port of the modulator unit and wherein the second output port of the MMI-coupler forms the second optical output port of the modulator unit.

The combiner may be configured to subtract the correction signal from the external electrical data signal in order to generate the electrical modulation signal.

The combiner may comprise an inverter and an adder. The inverter may be configured to invert the sign of the correction signal and generate an inverted correction signal. The adder may be configured to add the external electrical data signal and the inverted correction signal in order to generate the electrical modulation signal.

The monitor signal itself may form the correction signal.

Alternatively, an amplifier may be electrically arranged between the photodetector and the signal combiner. The amplifier may be configured to amplify the monitor signal and thereby generate the correction signal.

The amplifier may be a transimpedance amplifier.

The modulator unit, the photodetector, the amplifier and the combiner are preferably integrated in same semiconductor chip in such a close distance that the signal path extending from the second output of the modulator unit via the photodetector, the amplifier, and the combiner to the electrical ingress port of the modulator unit is so short that the signal travel time is smaller than 25% of a given bit duration.

The signal delay from the output of the combiner unit via the second output port of the modulator unit, the photodetector, the amplifier to the second electrical input port of the combiner unit is preferably shorter than 10 ps.

At least one optical filter or optical distortion element may be arranged in the optical signal path between the second optical output port of the modulator unit and the photodetector.

At least one electrical filter or electrical distortion element may be arranged in the electrical path between the photodetector and the electrical ingress port of the modulator unit.

A further embodiment of the invention relates to a method for generating an optical data signal based on an external electrical data signal, comprising the steps of modulating optical radiation by applying an electrical modulation signal to an electrical ingress port of a modulator unit, said modulator unit emitting said optical data signal at a first optical output port of the modulator unit, measuring the modulated optical radiation that is emitted at a second optical output of the modulator unit and providing a monitor signal, and electrically combining a correction signal that is based on the monitor signal, and said external electrical data signal and thereby forming said electrical modulation signal.

The bit duration of the external electrical data signal is preferably chosen to fulfil the following condition:

$$TB > 4*Tp$$

wherein TB describes the bit length of the external electrical data signal and Tp describes the travel time in the feedback signal path from the output of the combiner unit to the second electrical input port of the combiner unit.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
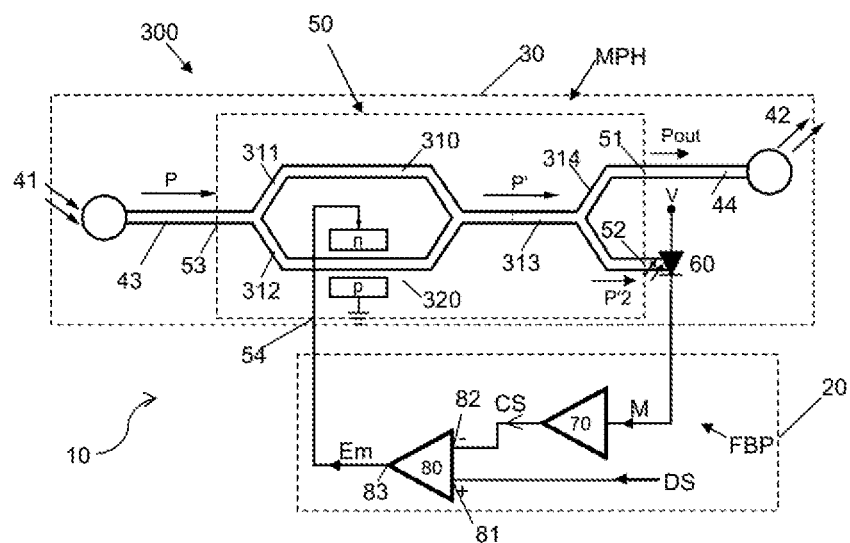
FIG. 1 illustrates a first exemplary embodiment of an optical signal modulator according to the present invention in a top view.

FIG. 1 shows a first exemplary embodiment of an optical signal modulator 300 according to the present invention. The optical signal modulator 300 comprises a semiconductor chip 10. A first region 20 of the semiconductor chip 10 contains electronic components of the optical signal modulator 300, and a second region 30 of the semiconductor chip 10 contains optical and electro-optical components of the optical signal modulator 300.

An optical input 41, an optical output 42, an input waveguide 43, an output waveguide 44, a modulator unit 50 and a photodetector 60 are located in the second region 30 of the semiconductor chip 10.

An amplifier 70 and an electrical signal combiner 80 are located in the first region 20 of the semiconductor chip 10.

The modulator unit 50 has an optical ingress port 53 for inputting optical radiation P, and an electrical ingress port 54 for inputting an electrical modulation signal Em. As will be explained in further detail below, the modulator unit 50 is configured to modulate the optical radiation P in response to the electrical modulation signal Em. A first portion of the modulated radiation P' leaves the modulator unit 50 at a first optical output port 51. A second portion of the modulated radiation P' leaves at a second optical output port 52.

The photodetector 60 is connected to the second optical output port 52 and measures the modulated optical radiation P'2 that is emitted at the second optical output port 52. The photodetector 60 provides a monitor signal M.

The amplifier 70 amplifies the monitor signal M and thereby generates a correction signal CS. The amplifier 70 may be a transimpedance amplifier.

The electrical signal combiner 80 has a first input port 81 for inputting an external electrical data signal DS and a second electrical input port 82 for inputting the correction signal CS. The combiner 80 may consist of or comprise an operational amplifier as well as other components (e.g. a pre-emphasis unit).

The electrical signal combiner 80 subtracts the correction signal CS from the external electrical data signal DS and generates the electrical modulation signal Em. The electrical modulation signal Em leaves the electrical signal combiner 80 at an electrical output port 83 and reaches the electrical ingress port 54 of the modulator unit 50.

The signal path that extends from the electrical output port 83 of the electrical combiner 80—via the electrical ingress port 54 of the modulator unit 50, the Mach-Zehnder-Interferometer 310, the second output port 52 of the modulator unit 50, the photo detector 60, the amplifier 70—to the second electrical input port 82 of the combiner 80 is hereinafter referred to as feedback path. The feedback path is designated by reference sign FBP in FIG. 1.

The path that extends from the optical ingress port 53 of the modulator unit 50 to the first optical output port 51 of the modulator unit 50 is hereinafter referred to as modulation path. The modulation path is designated by reference sign MPH in FIG. 1.

The signal modulator 300 may be configured to generate an optical data signal of a given bit duration. In this case, the modulator unit 50, the photodetector 60, the amplifier 70 and the combiner 80 are preferably located in such a close distance relative to another that the feedback path FBP is sufficiently short to provide a signal travel time below 25% of the bit duration. To this end, the modulator unit 50, the photodetector 60, the amplifier 70 and the combiner 80 are preferably integrated in the same semiconductor chip 10.

If the signal travel time does not exceed 25% of the bit duration, higher order nonlinearities that are caused in the modulation path MPH can be significantly compensated such that their impact on the signal quality of the modulated optical signal Pout is relatively small. The reduction of the higher order nonlinearities is caused by the feed-back loop (provided by the feedback path FBP) and in particular the combiner 80 which subtracts occurring nonlinear distortions from the external data signal DS.

Figure 2:
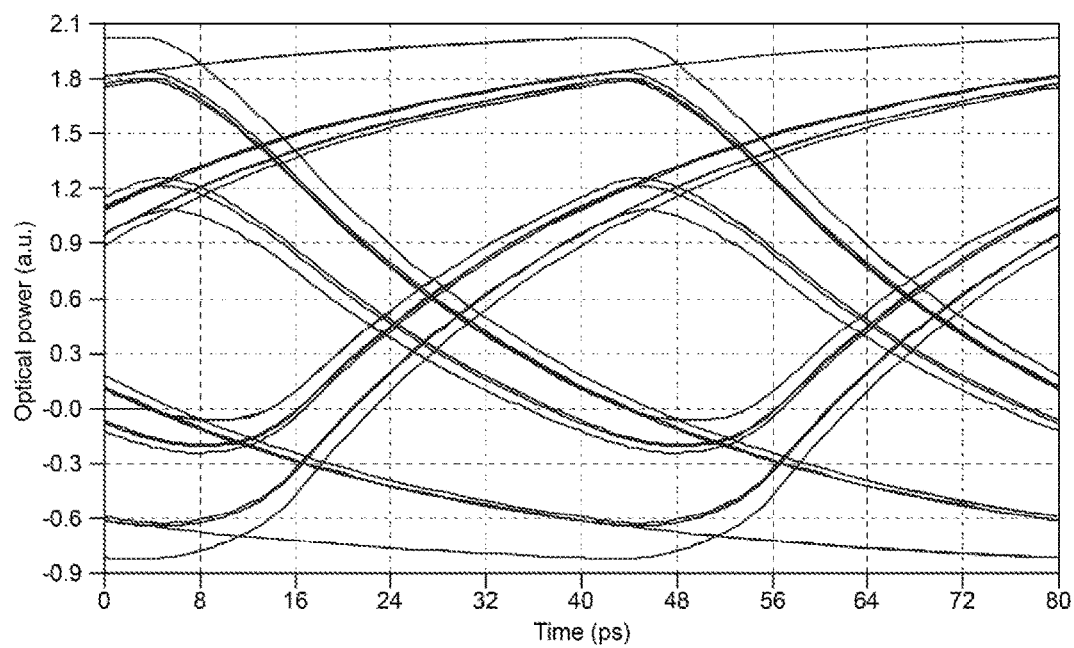
FIG. 2 illustrates an exemplary eye pattern generated by the embodiment of FIG. 1 without activated feedback loop and without reduction of higher order distortions.
Figure 3:
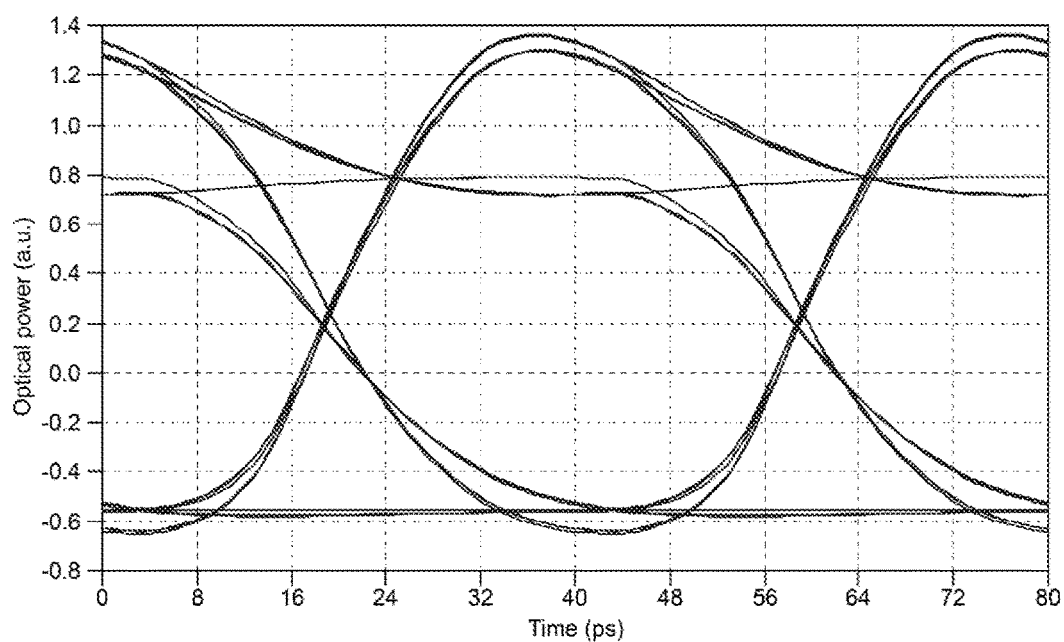
FIG. 3 illustrates an exemplary eye pattern generated by the embodiment of FIG. 1 with activated feedback loop and with a reduction of higher order distortions.

FIGS. 2 and 3 visualize the impact of the feedback path FBP on an NRZ-modulated optical signal Pout that exits the modulator unit 50 at the first optical output port 51. FIG. 2 shows an eye pattern, also known as an eye diagram, without compensation of the higher order nonlinearities, for instance in case that the combiner 80 is switched off.

FIG. 3 shows the respective eye pattern with compensation of the higher order nonlinearities.

Figure 4:
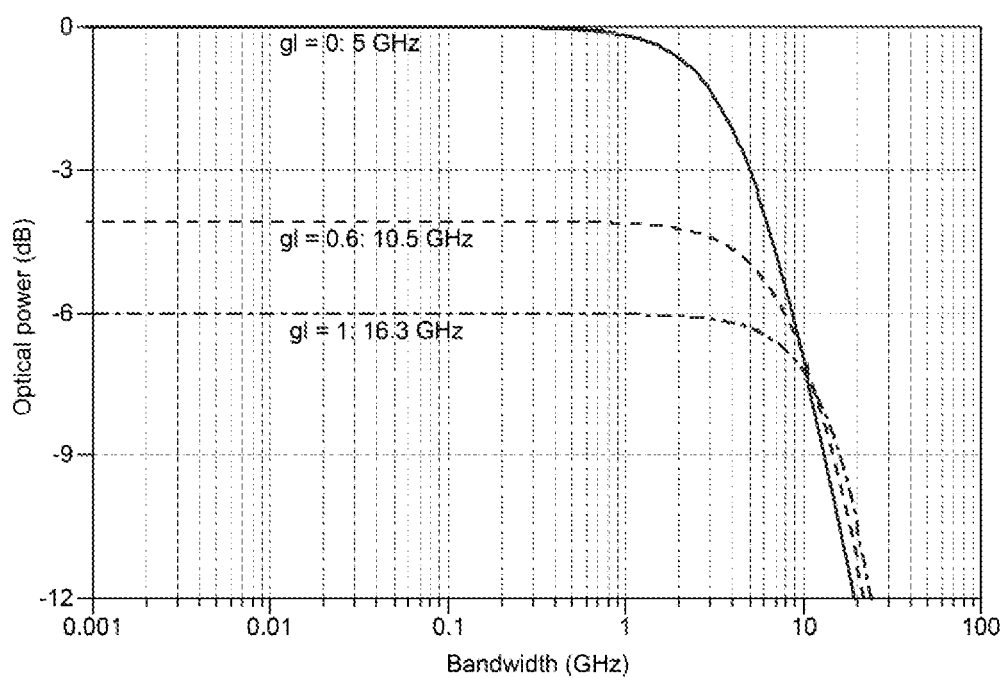
FIG. 4 illustrates the resulting bandwidth of the modulated optical output signal for different feedback gain values in the feedback path.

FIG. 1 shows the resulting increase of bandwidth due to feedback loop for different feedback gain values gl of the feedback path FBP. In the exemplary embodiment of FIG. 4, the bandwidth increases from 5 GHz to 16.3 GHz with increasing gain values gl.

For a signal modulator 300 with a given design and therefore a given length of the feedback path FBP, the bit duration of the external electrical data signal DS is preferably chosen to fulfil the following condition:

$$TB > 4*Tp$$

wherein TB describes the bit length of the external electrical data signal DS and Tp describes the travel time in the feedback path FBP from the second output 52 to the electrical ingress 54 port of the modulator unit 50.

E.g. for optical output signals Pout with a data rate of 10 GBit/s, the feedback path FBP should preferably be shorter than 5600 µm. In this case, the signal delay caused by the feedback path FBP is shorter than 25 ps (under consideration of the typical signal delay of 7.5 ps caused by the amplifier 70 (if present) and the combiner 80) and the above condition TB>4*Tp is met.

For optical output signals Pout with a data rate of 25 GBit/s, the feedback path FBP should preferably be shorter than 800 µm in order to achieve a signal delay in the feedback path FBP shorter than 10 ps (again under consideration of the typical signal delay of 7.5 ps caused by the amplifier 70 (if present) and the combiner 80).

The modulator unit 50 may comprise a Mach-Zehnder-Interferometer 310 and a phase modulator 320 located in either one or both of the interferometer arms 311 and 312 of the Mach-Zehnder-Interferometer 311. The electrical modulation signal Em is applied to at least one of the interferometer arms 311 and 312. The phase modulator 320 may comprise a pn-junction which allows carrier injection or depletion.

In the embodiment of FIG. 1 the Mach-Zehnder-Interferometer 310 also comprises an intermediate waveguide 313 and a remote 3 dB splitter 314. One exit port of the 3 dB splitter 314 forms the first optical output port 51 of the modulator unit 50, and the other the second optical output port 52 of the modulator unit 50.

Figure 5:
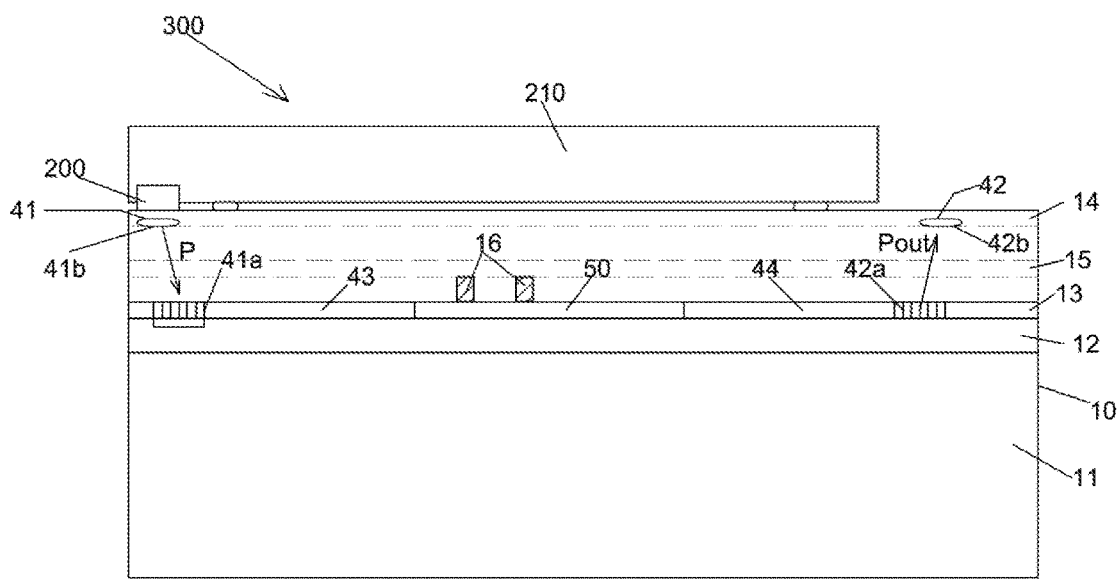
FIG. 5 illustrates a cross-section of the exemplary embodiment of FIG. 1, FIG. 6-10 illustrate further exemplary embodiments of optical signal modulators according to the present invention.

FIG. 5 shows a cross-section of the exemplary embodiment of FIG. 1.

The input waveguide 43, the output waveguide 44, the modulator unit 50, the photodetector 60, the amplifier 70 and the electrical signal combiner 80 preferably share the same waveguiding silicon layer 13 of the same semiconductor chip 10. The semiconductor chip 10 may be based on SOI (silicon on insulator) material, which comprises a silicon substrate 11, a buried oxide layer 12 on top of the substrate 11, and a silicon layer on top of the buried oxide layer. The latter silicon layer preferably forms the waveguiding silicon layer 13.

The optical input 41 and the optical output 42 may each comprise a deflecting element 41*a*, 42*a* and a lens 41*a*, 41*b*. The deflecting elements 41*a* and 42*a* are preferably gratings formed in the waveguiding silicon layer 13 and therefore in the frontend of the semiconductor chip 10. The lenses 41*b* and 42*b* are preferably formed in at least one backend layer 14 of the backend of the semiconductor chip 10.

An emitter 200 (e.g. a laser) may be flip-chip mounted on the semiconductor chip 10. For instance, the emitter 200 may be mounted on the semiconductor chip 10 by means of a submount 210. The optical emitter 200 is preferably a continuous wave laser. The optical emitter 200 may be a component of the optical signal modulator 300 or an external component.

The front end and/or backend of the semiconductor chip 10 may further comprise one or more metal layers 15 and vias 16 (via: vertical interconnect access, vertical electrical connection between layers). The metal layers 15 and vias 16 can be used to electrically connect components of the semiconductor chip 10 with another and/or with other components of the optical signal modulator 300 (e.g. the emitter 200) and/or with external components.

Figure 6:
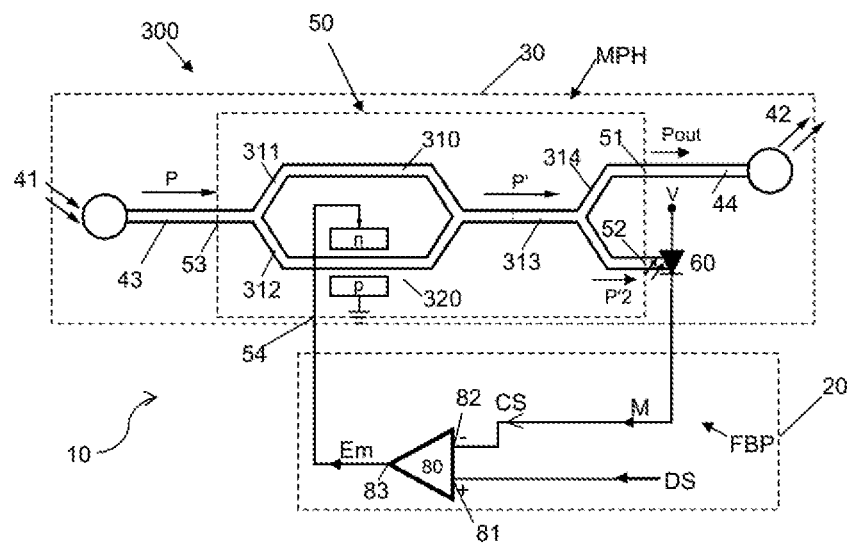

FIG. 6 shows a second exemplary embodiment of an optical signal modulator 300 according to the present invention. In contrast to the optical signal modulator 300 of FIG. 1, the monitor signal M itself forms the correction signal CS. The amplifier 70 is omitted.

Figure 7:
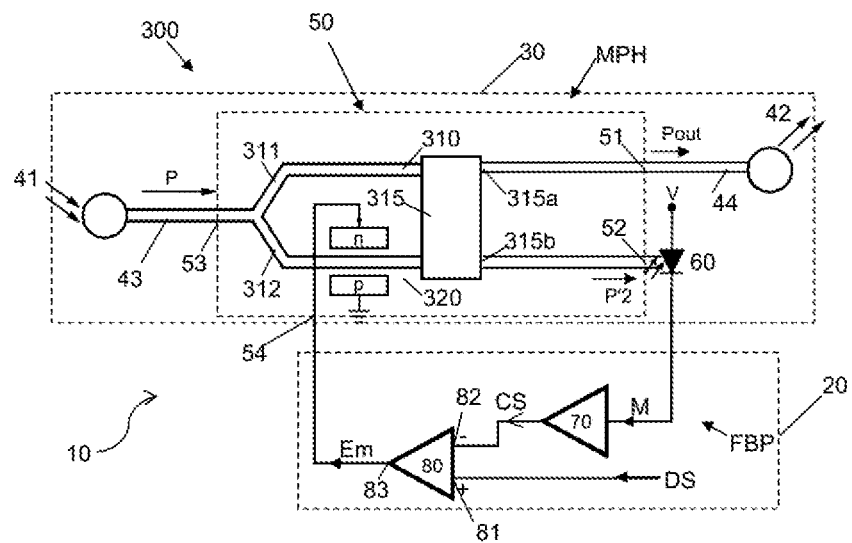

FIG. 7 shows a third exemplary embodiment of an optical signal modulator 300 according to the present invention. In contrast to the optical signal modulator 300 of FIG. 1, the Mach-Zehnder-Interferometer 310 comprises a 3 dB-MMI-output-coupler 315. The 3 dB-MMI-output-coupler 315 has a first output port 315*a* and a second output port 315*b*. The first output port 315*a* of the MMI-coupler 315 forms the first optical output port 51 of the modulator unit 50 and is connected to the data output port 42 of the optical signal modulator 300. The second output port 315*b* of the MMI-coupler 315 forms the second optical output port 52 of the modulator unit 50 and is connected with the photodetector 60.

Figure 8:
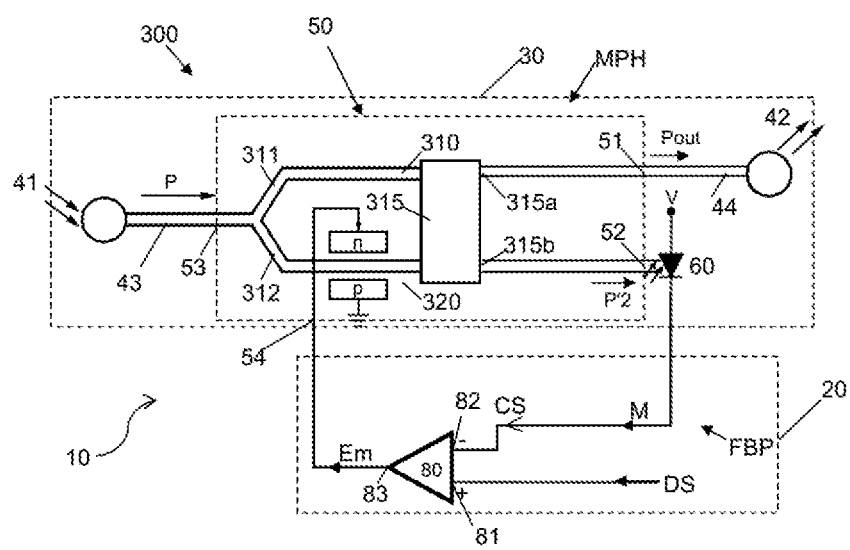

FIG. 8 shows a fourth exemplary embodiment of an optical signal modulator 300 according to the present invention. In contrast to the optical signal modulator 300 of FIG. 7, the monitor signal M itself forms the correction signal CS. The amplifier 70 is omitted.

Figure 9:
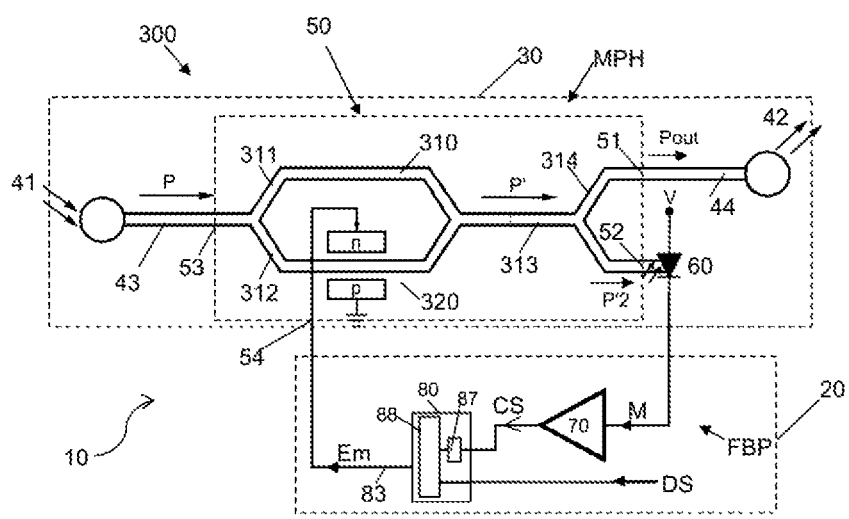

FIG. 9 shows a fifth exemplary embodiment of an optical signal modulator 300 according to the present invention. In contrast to the optical signal modulator 300 of FIG. 1, the combiner 80 consists of an inverter 87 and an adder 88. The inverter 87 inverts the sign of the correction signal CS and generates an inverted correction signal. The adder 88 adds the external electrical data signal DS and the inverted correction signal in order to generate the electrical modulation signal Em.

Figure 10:
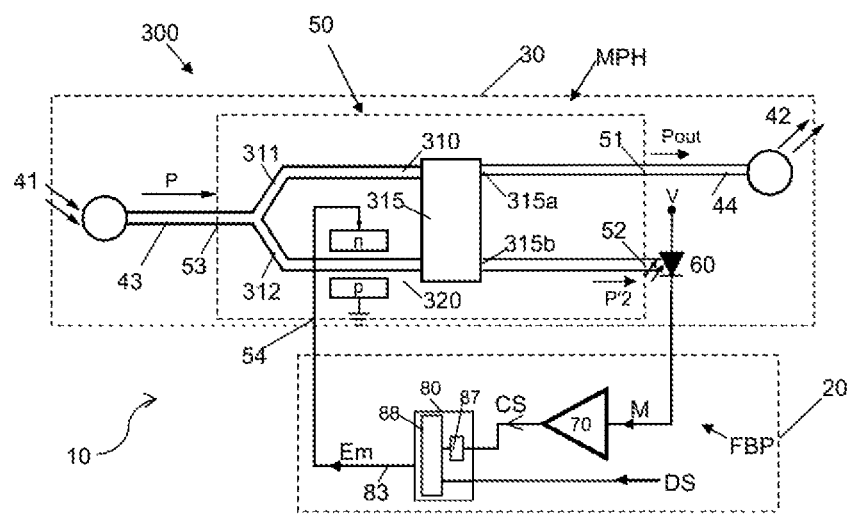

FIG. 10 shows a sixth exemplary embodiment of an optical signal modulator 300 according to the present invention. The optical signal modulator 300 comprises a Mach-Zehnder-Interferometer 310 as discussed in connection with FIG. 7.

In contrast to the optical signal modulator 300 of FIG. 7, the combiner 80 consists of an inverter 87 and an adder 88. The combiner 80 of FIG. 10 may be identical with the combiner discussed in connection with FIG. 9.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

REFERENCE SIGNS 10 semiconductor chip
11 silicon substrate
12 buried oxide layer
13 waveguiding silicon layer
14 backend layer
15 metal layer
16 via
20 first region of the semiconductor chip
30 second region of the semiconductor chip
41 optical input
41a deflecting element
41b lens
42 optical output
42a deflecting element
42b lens
43 input waveguide
44 output waveguide
50 modulator unit
51 first optical output port
52 second optical output port
53 optical ingress port
54 electrical ingress port
60 photodetector
70 amplifier
80 electrical signal combiner
81 first electrical input port
82 second electrical input port
83 electrical output port
87 inverter
88 adder
200 emitter
210 submount
300 optical signal modulator
310 Mach-Zehnder-Interferometer
311 interferometer arm
312 interferometer arm
313 intermediate waveguide
314 3 dB splitter
315 3 dB-MMI-output-coupler
315a first output port
315b second output port
320 phase modulator
CS correction signal
DS external electrical data signal
Em electrical modulation signal
FBP feedback path
gl feedback gain value
M monitor signal
MPH modulation path
P optical radiation
P' first portion of the modulated radiation
P'2 second portion of the modulated optical radiation

What is claimed is:

1. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal,
a photodetector connected to the second optical output port and configured to measure the modulated optical radiation that is emitted at the second optical output port, and to provide a monitor signal, and
an electrical signal combiner having a first input port for inputting an external electrical data signal, a second electrical input port for inputting a correction signal that is based on the monitor signal, and an electrical output port that is connected to the electrical ingress port of the modulator unit,
wherein the combiner is configured to generate said electrical modulation signal by combining the external electrical data signal and the correction signal,
wherein the modulator unit, the photodetector and the combiner are integrated in the same semiconductor chip, and
wherein the signal delay from the output port of the combiner unit via the electrical ingress port of the modulator unit, the second output port of the modulator unit, and the photodetector to the second electrical input port of the combiner is shorter than 25 ps.

2. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal,
a photodetector connected to the second optical output port and configured to measure the modulated optical radiation that is emitted at the second optical output port, and to provide a monitor signal, and
an electrical signal combiner having a first input port for inputting an external electrical data signal, a second electrical input port for inputting a correction signal that is based on the monitor signal, and an electrical output port that is connected to the electrical ingress port of the modulator unit,
wherein the combiner is configured to generate said electrical modulation signal by combining the external electrical data signal and the correction signal,
wherein the modulator unit, the photodetector and the combiner are integrated in the same semiconductor chip, and
wherein the signal modulator is configured to generate an optical data signal having a given bit duration, the modulator unit, the photodetector and the combiner are integrated in the same semiconductor chip and the signal path extending from the second output of the modulator unit via the photodetector and the combiner to the electrical ingress port of the modulator unit is so short that the signal travel time falls below 25% of said given bit duration.

3. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal,
a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, wherein the modulator unit comprises an MMI-coupler having a first output port and a second output port, wherein the first output port of the MMI-coupler forms the first optical output port of the modulator unit as well as a data output port of the optical signal modulator, and wherein the second output port of the MMI-coupler forms the second optical output port of the modulator unit.

4. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, wherein the modulator unit comprises a Mach-Zehnder-Interferometer and a phase modulator located in at least one interferometer arm of the Mach-Zehnder-Interferometer, wherein said electrical modulation signal is applied to the at least one phase modulator, wherein the Mach-Zehnder-Interferometer comprises a 3 dB-output-coupler, wherein the 3 dB-output-coupler is an MMI-coupler having a first output port and a second output port, and wherein the first output port of the MMI-coupler forms the first optical output port of the modulator unit, and the second output port of the MMI-coupler forms the second optical output port of the modulator unit.

5. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, wherein the combiner comprises an inverter and an adder, wherein the inverter is configured to invert the sign of the correction signal and generate an inverted correction signal, and wherein the adder is configured to add the external electrical data signal and the inverted correction signal in order to generate the electrical modulation signal.

6. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, wherein an amplifier is electrically arranged between the photodetector and the signal combiner and the amplifier is configured to amplify the monitor signal and thereby generate the correction signal, and wherein the signal modulator is configured to generate an optical data signal of a given bit duration, and the modulator unit, the photodetector, the amplifier and the combiner are integrated in same semiconductor chip in such a close distance that the signal path extending from the output port of the combiner unit via the electrical ingress port of the modulator unit, the second output port of the modulator unit, the photodetector, and the amplifier to the second electrical input port of the combiner is so short that the signal travel time is smaller than 25% of said given bit duration.

7. An optical signal modulator comprising
a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, wherein an amplifier is electrically arranged between the photodetector and the signal combiner and the amplifier is configured to amplify the monitor signal and thereby generate the correction signal, and wherein the signal delay from the output port of the combiner unit via the electrical ingress port of the modulator unit, the second output port of the modulator unit, the photodetector, and the amplifier to the second electrical input port of the combiner is shorter than 25 ps.

8. An optical signal modulator comprising a modulator unit having an optical ingress port for inputting optical radiation, a first and second optical output port each for outputting modulated optical radiation, and an electrical ingress port for inputting an electrical modulation signal, the modulator unit being configured to modulate the optical radiation in response to the electrical modulation signal, a photodetector connected to the second optical output port and configured to measure the modulated optical radiation that is emitted at the second optical output port, and to provide a monitor signal, and an electrical signal combiner having a first input port for inputting an external electrical data signal, a second electrical input port for inputting a correction signal that is based on the monitor signal, and an electrical output port that is connected to the electrical ingress port of the modulator unit, wherein the combiner is configured to generate said electrical modulation signal by combining the external electrical data signal and the correction signal, and wherein at least one electrical filter or electrical distortion element is arranged in the electrical path between the photodetector and the electrical ingress port of the modulator unit.

9. A method for generating an optical data signal based on an external electrical data signal, comprising the steps of modulating optical radiation by applying an electrical modulation signal to an electrical ingress port of a modulator unit, said modulator unit emitting said optical data signal at a first optical output port of the modulator unit, measuring the modulated optical radiation that is emitted at a second optical output of the modulator unit and providing a monitor signal, and electrically combining a correction signal that is based on the monitor signal, and said external electrical data signal and thereby forming said electrical modulation signal, wherein the bit duration of the external electrical data signal is chosen to fulfill the following condition:

$$TB > 4*Tp, \text{ and}$$

wherein TB describes the bit length of the external electrical data signal and Tp describes the travel time in the monitor signal path from the output of the combiner unit to the second electrical input port of the combiner unit.

\* \* \* \* \*